United States Patent
Klier

(10) Patent No.: US 12,043,776 B2
(45) Date of Patent: Jul. 23, 2024

(54) PRESSURE SENSITIVE ADHESIVE ELECTROLYTE

(71) Applicant: tesa SE, Norderstedt (DE)

(72) Inventor: Daniel Klier, Reinbek (DE)

(73) Assignee: TESA SE, Norderstedt (DE)

(*) Notice: Subject to any disclaimer, the term of this patent is extended or adjusted under 35 U.S.C. 154(b) by 134 days.

(21) Appl. No.: 17/317,984

(22) Filed: May 12, 2021

(65) Prior Publication Data

US 2021/0355350 A1 Nov. 18, 2021

(30) Foreign Application Priority Data

May 14, 2020 (DE) ..................... 10 2020 206 126.2

(51) Int. Cl.
| | | |
|---|---|---|
| H01M 10/0565 | (2010.01) | |
| C08F 2/50 | (2006.01) | |
| C08F 220/30 | (2006.01) | |
| C09J 7/38 | (2018.01) | |
| C09J 9/02 | (2006.01) | |
| H01M 10/058 | (2010.01) | |

(52) U.S. Cl.
CPC ............... C09J 7/385 (2018.01); C08F 2/50 (2013.01); C08F 220/306 (2020.02); C09J 9/02 (2013.01); H01M 10/0565 (2013.01); H01M 10/058 (2013.01); C09J 2203/33 (2013.01); C09J 2301/124 (2020.08); H01M 2300/0082 (2013.01); H01M 2300/0097 (2013.01)

(58) Field of Classification Search
CPC ........ C09J 7/385; C09J 9/02; C09J 2301/124; C09J 2203/33; C08F 220/306; C08F 2/50; H01M 10/0565; H01M 10/058; H01M 2300/0082; H01M 2300/0097

See application file for complete search history.

(56) References Cited

U.S. PATENT DOCUMENTS

| | | | | |
|---|---|---|---|---|
| 5,508,107 A | * | 4/1996 | Gutman | ................. C09J 133/08 |
| | | | | 428/339 |
| 6,045,951 A | * | 4/2000 | Wendsjo | ........... H01M 10/0569 |
| | | | | 429/317 |
| 6,296,783 B1 | | 10/2001 | Shindo et al. | |
| 8,652,355 B2 | | 2/2014 | Klier et al. | |
| 2011/0074279 A1 | | 3/2011 | Klier et al. | |
| 2014/0220427 A1 | * | 8/2014 | Yu | ..................... H01M 10/0565 |
| | | | | 429/189 |
| 2014/0295180 A1 | | 10/2014 | Yamagata et al. | |

FOREIGN PATENT DOCUMENTS

| | | |
|---|---|---|
| CN | 1210613 A | 3/1999 |
| DE | 10256515 A1 | 7/2004 |
| DE | 10259549 A1 | 7/2004 |
| DE | 10 2008 062 129 A1 | 6/2010 |
| DE | 10 2014 108 012 A1 | 12/2015 |
| EP | 0896340 A1 | 2/1999 |
| EP | 1 640 427 A1 | 3/2006 |
| KR | 2015 0016171 A | 2/2015 |

OTHER PUBLICATIONS

Alexandre Sandra A et al: "A highly adhesive PIL/IL gel polymer electrolyte for use in flexible solid state supercapacitors", Electrochimica Acta, No. 299, pp. 789-799, (2019).

* cited by examiner

Primary Examiner — Brian R Ohara
(74) Attorney, Agent, or Firm — Norris McLaughlin, P.A.

(57) ABSTRACT

A pressure sensitive adhesive polymer electrolyte having a peel adhesion by test A of more than 1 N/cm and an ionic conductivity by test B of more than $10^{-6}$ $(ohm*cm)^{-1}$, prepared by polymerizing:

5-60 wt % of acrylate monomer from the group of the (meth)acrylic esters having 4-15 carbon atoms, which as a homopolymer would have a $T_g$ by test C of less than $-30°$ C., 10-80 wt % of acrylate monomer from the group of the (meth)acrylic esters having 4-25 carbon atoms and containing at least one heteroatom, which as a homopolymer would have a $T_g$ by test C of less than $100°$ C., 0.05-10 wt % of initiator, 2-13 wt % of conducting salt, optionally plasticizer, and optionally solvent, which after the polymerization is typically removed at least partly, where optionally one or more of the components are added at least proportionally only during or after the polymerization.

17 Claims, No Drawings

PRESSURE SENSITIVE ADHESIVE ELECTROLYTE

The present application claims priority of German Patent Application No. 10 2020 206 126.2, filed May 14, 2020, the entire contents of which are hereby incorporated herein by reference.

The invention relates to a pressure sensitive adhesive electrolyte and to a method for producing the pressure sensitive adhesive electrolyte in the form of an adhesive tape to allow it to be processed more easily in the form of known liquid or solid electrolytes into complete electrochemical systems or cells such as batteries, sensors or electrochromic cells. These electrochemical systems or cells consist in general of support materials, current collectors, anode materials, cathode materials and the electrolytes.

Electrolytes are nowadays widespread in a variety of applications, ranging from primary and secondary batteries through to electrochromic applications, i.e. to their use in electrochromic systems.

Electrolytes generally speaking are chemical compounds which are present as solids, as liquids or in dissociated solution in ions. Under the external influence of an electrical field, this chemical compound moves along the field lines. However, the possible surrounding matrix (polymer, inorganic material, ceramic, film) is also often referred to together with the dissociated chemical compound (conducting salt) as an electrolyte. The latter, more comprehensive definition will be used below.

The core function of an electrolyte is the ionic conductivity of at least one ionic species, while the electrolyte behaves largely chemically inertly towards other chemical components of a system, which it neither conducts, absorbs or reacts with. Electrochemical cells, such primary or secondary batteries, electrochromic systems or else electrochemical-based sensors, are typically constructed from two half-cells, which except for the flow, that is the exchange, of certain ions, must remain chemically and electrically separate from one another, in order to enable them to function in the manner intended.

All electrolytes known or present for the separation of the half-cells have a significant disadvantage: they must be assembled with the half-cells by costly and inconvenient processes and product designs.

Known from the prior art are electrolytes which are to be assembled, for example, mechanically, with the sheetlike or weblike materials being clamped, wound firmly with corresponding web tension, or bonded at the sides to a third material. Also known are electrolytes which themselves take on the function of an adhesive, by chemically curing after assembly of the half-cells. They are applied in liquid form to one half-cell, assembled with the second half-cell and subsequently cured. The curing is initiated either thermally or by means of actinic radiation such as UV radiation for example.

A disadvantage is that the curing represents a cost-intensive extra process step, which requires time, development effort and complicated process engineering and process monitoring techniques. Furthermore, the assembly of the half-cells in batteries or electrochromic systems by means of the viscous liquid electrolyte leads to considerable fluctuations in thickness, which prevent a product design with an exactly defined thickness and hence also product properties. Particularly in the case of wound (cylindrical cells) or folded (pouch cells) multi-layer constructions of the functional layers (current collectors, anode materials, cathode materials, electrolytes), the in-process control of a homogeneous layer construction is not possible, and costly rejects are the result. In order to reduce rejects, attempts are made in some cases to inject uncured electrolyte prepolymer ("syrup") into the cell after winding, and then to cure it. Even with this process, however, it is not possible to monitor or precisely control the layer thickness.

As well as simple production and ease of application, there are other important properties of the electrolyte: high ionic conductivity over a wide temperature range, cycling stability, fire safety, optical transparency, no adverse effect on health, the possibility of reuse, and chemical stability with respect to the other active materials. Moreover, the greater the proportion of polymer (e.g. PMMA) in the mixture, the lower the ionic conductivity. If the polymer fraction is too small, the dimensional stability is no longer sufficient to reliably prevent mechanical damage and short-circuits, so requiring the additional introduction into the electrolyte layer of a porous film membrane, which complicates the process and makes it more expensive.

In standard procedures, gel polymer electrolytes (GPEs) are made on the basis of polyethylene oxide (PEO), polymethyl methacrylate (PMMA), polyacrylonitrile (PAN) or polyvinylidene fluoride-hexafluoropropylene (PVDF-HFP) (Dong Zhou, Li-Zehn Fan, Huanhuan Fan, Qiao Shi: Electrochemical performance: Electrochemical performance of trimethylolpropane-trimethylacrylate-based GPE prepared by in situ thermal polymerization; Electrochimica Acta 89:334-338, February 2013). Usually very high fractions of plasticizer/conducting salt mixtures up to 97% are used in order to achieve a high ionic conductivity. These polymer electrolytes have low dimensional stability, and so cannot be wound to large jumbo rolls without oozing, and, while they may have a tack, they also have no cohesion and are therefore not suitable for the bonding of electrochemical half-cells. In the examples designated, the porous film support Celgard 2400 (Celgard LLC, USA) is additionally employed in order to produce a practicable cell.

Conducting salts are known for example from DE 10 2014 108 012 A1, such as lithium [3,5-bis(trifluoromethyl)pyrazolide] or LiTSFI. Using these conducting salts, it is possible to produce chemically inert liquid and polymer electrolytes which are stable towards hydrolysis. DE 10 2008 062 129 A1 describes a pressure-sensitive adhesive with a high permittivity, which possesses a high glass transition temperature.

It is an object of the present invention at least partly to overcome the aforesaid disadvantages and to provide an electrolyte which is self-adhesive ("pressure sensitive adhesive") and has a defined thickness, which preferably remains constant irrespective of mechanical loads during the process and during later use.

It is an object of the invention, moreover, to provides an electrolyte which can be applied easily in the production process by lamination to the first half-cell and can be joined by lamination to the second half-cell.

The object is achieved by means of a pressure sensitive adhesive polymer electrolyte having the features of claim 1, i.e. by a pressure sensitive adhesive polymer electrolyte having a peel adhesion by test A of more than 1 N/cm and an ionic conductivity by test B of more than $10^{-6}$ (ohm* cm)$^{-1}$, i.e. $10^{-6}$ S/cm, prepared by polymerizing a mixture comprising at least the following components:

5-60 wt %, preferably 10-50 wt %, more preferably 10-40 wt %, more particularly 15-30 wt % of acrylate monomer from the group of the (meth)acrylic esters having 4-15 carbon atoms, which as a homopolymer, i.e. in homopolymerized form, would have a $T_g$ by test C of less than −30° C., 10-80 wt %, preferably 35-75 wt %, more preferably 40-70 wt %, more particularly 50-70 wt % of acrylate monomer from the group of the (meth)acrylic esters having 4-25 carbon atoms and containing at least one heteroatom, which as a homopolymer, i.e. in homopolymerized form, would have a $T_g$ by test C of less than +100° C., 0.05-10 wt %, preferably 0.1-2 wt %, more particularly 0.1-0.5 wt % of initiator, wherein the initiator is preferably a thermal initiator and/or a photoinitiator, especially preferably a photoinitiator, 2-13 wt %, preferably 3-10 wt %, more particularly 4-8 wt % of conducting salt, optionally plasticizer, as for example 5 to 50 wt %, preferably 10 to 30 wt % and more particularly 15 to 25 wt % of plasticizer, and optionally solvent, which after the polymerization is typically removed at least partly, as for example substantially completely, where optionally one or more of the components are added at least proportionally, as for example completely, only during or after the polymerization.

Preferred embodiments of the polymer electrolyte are also found in the dependent claims.

In accordance with the present specification, the only valid solvents (compounds) are solvents which at atmospheric pressure, i.e. 1013 mbar, have a boiling point of less than 100° C. Solvents having a boiling point at 1013 mbar of 100° C. or more, and solvents which have no boiling point at 1013 mbar, instead decomposing at 100° C. or more, are considered by contrast to be plasticizers for the purposes of the present specification. When the weight fractions of the components are stated, in accordance with the invention, the solvent is disregarded, but not plasticizers such as, for example, ethylene carbonate (EC) or diethyl carbonate (DEC). If solvent is used in the sense of the present specification for the polymerization of the invention, it is preferably substantially removed after the polymerization, particularly since, because of the low boiling point, the solvent may adversely affect the stability of the electrolyte and of the subsequent electrochemical cell.

Components optionally added only during or after the polymerization are of course already included in the specified weight fractions.

In accordance with the present invention, the term "(meth) acrylic esters" encompasses both methacrylic esters and acrylic esters. The number of carbon atoms in the (meth) acrylic esters, moreover, is based in each case on the entire molecule, i.e. the acid component and alcohol component together.

In the acrylate monomer from the group of the (meth) acrylic esters having 4-25 carbon atoms and containing at least one heteroatom, which as a homopolymer would have a $T_g$ by test C of less than +100° C., the heteroatom is preferably O, S or N, more preferably O or N and more particularly O. To the skilled person it is clear that the at least one heteroatom in the acrylate monomer is present in addition to the two O atoms (oxygen atoms) of the ester functionality, i.e. (C=O)O. The at least one heteroatom is typically contained in the hydrocarbon radical of the alcohol component of the (meth)acrylic ester.

The acrylate monomer from the group of the (meth) acrylic esters having 4-15 carbon atoms, which as a homopolymer would have a $T_g$ by test C of less than −30° C., contains preferably no heteroatom apart from the two O atoms of the ester functionality.

The acrylate monomer from the group of the (meth) acrylic esters having 4-25 carbon atoms and containing at least one heteroatom, which as a homopolymer would have a $T_g$ by test C of less than 100° C., consists preferably at least proportionally of acrylate monomer which as a homopolymer would have a $T_g$ by test C of at least −30° C., more particularly at least 0° C. This is typically beneficial to a number of properties of the pressure sensitive adhesive electrolyte, such as the cohesion, holding power and heat resistance. In one preferred embodiment the mixture to be polymerized comprises 15 to 50 wt %, preferably 25 to 40 wt %, of acrylate monomer from the group of the (meth) acrylic esters having 4-25 carbon atoms and containing at least one heteroatom, which as a homopolymer has a $T_g$ by test C of −30° C. to less than +100° C., preferably 0° C. to 50° C.

The acrylate monomer from the group of the (meth) acrylic esters having 4-15 carbon atoms, which as a homopolymer would have a $T_g$ by test C of less than −30° C., may comprise one or more monomers. The same is true of the acrylate monomer from the group of the (meth)acrylic esters having 4-25 carbon atoms and containing at least one heteroatom, which as a homopolymer would have a $T_g$ by test C of less than 100° C. Through the selection of suitable acrylate monomers to be polymerized, and their amount, it is possible, moreover, to tailor properties such as the glass transition temperature $T_g$ and the polarity of the pressure sensitive adhesive polymer electrolyte.

The glass transition temperatures $T_g$ of the stated homopolymers relate typically in each case to an infinite molecular weight; in other words, with regard to the homopolymers, $T_g$ typically refers in each case to $T_g^\infty$. The skilled person is aware that low molecular weights increase the chain mobility and so lower the $T_g$. The empirical rule applying is $$T_g = T_g^\infty - \frac{K}{M}$$

in which $T_g$ is the glass temperature of a polymer of number-average molecular weight M, i.e. $M_n$, K is a constant factor dependent on the type of polymer, and $T_g^\infty$ is the glass transition temperature of the polymer at infinite molecular weight (see Bernd Tieke: "Makromolekulare Chemie—eine Einführung", VCH-Verlag, 2004, p. 270 f.). If, therefore, for a particular polymer, the measured $T_g$ values are plotted against K/M for different number-average molecular weights M, $T_g^\infty$ is obtained as a Y-axis section.

The pressure sensitive adhesive polymer electrolyte of the invention is preferably characterized by an oxidative stability by test I of more than 2.5 V.

In another embodiment, the pressure sensitive adhesive polymer electrolyte of the invention is characterized in that the polymer of the polymer matrix possesses a relative permittivity $\varepsilon_r$ by test J of more than 3.5, preferably more than 4.5.

The electrolyte of the invention can be used in batteries, but also in transparent electrochromic systems, since the electrolyte of the invention exhibits only minimal ageing phenomena, hence remaining chemically stable for a long time, and enables stable and weathering-resistant bonding even on outdoor use for years, at the same time retaining its high-grade transparent optical properties. This stability is possible owing to the finding of monomers, conducting salts and, where used, plasticizers which in the combination according to the invention do not interact with UV light and have a propensity towards decomposition reactions.

The object is achieved, moreover, by a method for producing the pressure sensitive adhesive polymer electrolyte of the invention. In the method a mixture is polymerized which comprises at least the following components:

- 5-60 wt %, preferably 10-50 wt %, more preferably 10-40 wt %, more particularly 15-30 wt % of acrylate monomer from the group of the (meth)acrylic esters having 4-15 carbon atoms, which as a homopolymer would have a $T_g$ by test C of less than −30° C.,
- 10-80 wt %, preferably 35-75 wt %, more preferably 40-70 wt %, more particularly 50-70 wt % of acrylate monomer from the group of the (meth)acrylic esters having 4-25 carbon atoms and containing at least one heteroatom, which as a homopolymer would have a $T_g$ by test C of less than 100° C.,
- 0.05-10 wt %, preferably 0.1-2 wt %, more particularly 0.1-0.5 wt % of initiator, wherein the initiator is preferably a thermal initiator and/or a photoinitiator, especially preferably a photoinitiator,
- 2-13 wt %, preferably 3-10 wt %, more particularly 4-8 wt % of conducting salt,
- optionally plasticizer, as for example 5 to 50 wt %, preferably 10 to 30 wt % and more particularly 15 to 25 wt % of plasticizer,
- and optionally solvent, which after the polymerization is typically removed at least partly, as for example substantially completely,
- where optionally one or more of the components are added at least proportionally, as for example completely, only during or after the polymerization.

In accordance with the invention the solvent is disregarded when stating the weight fractions of the components.

The invention relates, moreover, to a pressure-sensitive adhesive tape comprising at least one layer of the pressure sensitive adhesive polymer electrolyte of the invention, with the pressure-sensitive adhesive tape being preferably double-sidedly adhesive, i.e. being a double-sided adhesive tape, and more particularly an adhesive transfer tape. The general expression "adhesive strip" (pressure-sensitive adhesive strip), synonymously also "adhesive tape" (pressure-sensitive adhesive tape), in the sense of this invention encompasses all sheetlike structures such as two-dimensionally extended films or film sections, tapes with extended length and limited width, tape sections and the like, and lastly also die-cuts or labels. The pressure-sensitive adhesive tape therefore has a lengthwise extent (x-direction) and a widthwise extent (y-direction). The pressure-sensitive adhesive tape also has a thickness (z-direction) extending perpendicularly to both extents, with the widthwise extent and lengthwise extent being greater by a multiple than the thickness. The thickness is as far as possible the same, preferably exactly the same, over the entire areal extent of the pressure-sensitive adhesive tape, determined by length and width. The pressure-sensitive adhesive tape of the invention is more particularly in web form. A web is understood to mean an object whose length (x-direction extent) is greater by a multiple than the width (y-direction extent), and the width along the entire length remains roughly and preferably exactly the same. The exposed surfaces of the pressure-sensitive adhesive tape may advantageously be furnished with materials having an anti-adhesive coating on both sides, such as a release paper or a release film, also called liner, as a temporary carrier. A liner (release paper, release film) is not part of a pressure-sensitive adhesive tape, but merely an aid to its production, storage and/or further processing by die-cutting. Furthermore, unlike an adhesive tape carrier, a liner is not joined fixedly to a layer of adhesive. The pressure-sensitive adhesive tape preferably consists of a single layer of the pressure sensitive adhesive polymer electrolyte of the invention, and so the pressure-sensitive adhesive tape constitutes a single-layer system. A single-layer, double-sidedly self-adhering, i.e. pressure sensitive adhesive tape, i.e. double-sided adhesive tape of this kind is also referred to as a "transfer tape".

The invention relates, moreover, to a product roll comprising (a) a roll core and (b) in web form, a pressure sensitive adhesive polymer electrolyte of the invention or a pressure-sensitive adhesive tape of the invention, with the pressure sensitive adhesive polymer electrolyte or the pressure-sensitive adhesive tape being wound in multiple plies in the form of an Archimedean spiral on the roll core.

The invention relates, moreover, to the use of the pressure sensitive adhesive polymer electrolyte or pressure-sensitive adhesive tape of the invention in an electrochromic glazing system or a battery.

A further subject of the invention is an electrochromic system comprising a first half-cell A and a second half-cell B, with the two half-cells A and B being joined to one another over the full area or a partial area by way of a pressure sensitive adhesive polymer electrolyte of the invention or a pressure-sensitive adhesive tape of the invention, where preferably the first half-cell A has a sheetlike, electrically conductively coated polymer or glass substrate body with an anode material applied partially or over the full area on the conductively coated side, and the second half-cell B likewise has a sheetlike and electrically conductively coated polymer or glass substrate body with a cathode material applied partially or over the full area on the electrically conductively coated side.

The invention relates, furthermore, to a method for producing an electrochromic system, wherein a first half-cell A and a second half-cell B are joined to one another to form an electrochromic system by lamination of a pressure sensitive adhesive polymer electrolyte of the invention or of a pressure-sensitive adhesive tape of the invention, where the half-cells A and B are preferably as defined above.

The invention also relates generally, furthermore, to constructions and methods for constructing electrochemical cells as described above, where two half-cells are joined by the electrolyte of the invention. These electrochemical cells are also referred to as batteries but the intention is to store and delivery electrical energy. In that case the half-cells A and B are optimized to be able to accommodate a large amount of the cation. Examples of suitable anode material include graphite formulations or metallic lithium, applied to a conductive electrode which in this case is not necessarily transparent. An example of a suitable cathode material is a lithium iron phosphate formulation admixed with small amounts of graphite and polyvinylidene fluoride/polyhexafluoropropylene mixture (binder). Diverse anode and cathode materials for cell manufacture are widely known to the skilled person.

Optimal performance requires that the pressure sensitive adhesive electrolyte polymer matrix have an extremely high permittivity, to allow it to dissolve the conducting salts therein at sufficiently high concentration. For this purpose, in particular, the cations must be mobile and dissociated, while the associated anions can be mobilized by the polymer matrix. A low viscosity as well, including at low temperatures, is beneficial to the mobility of the cations. Unfortunately, pressure sensitive adhesive polymer systems having a high permittivity have proved to have a relatively low viscosity, and because of the high glass transition temperature the typical temperature of use is close to or even below the glass transition temperature, which is detrimental as far as the mobility of the ions is concerned. Surprisingly, however, it has emerged that in spite of the high glass transition point, the ionic conductivity of pressure-sensitive adhesives of the invention is able to adopt high values.

Electrolytes of the invention are self-adhesive, i.e. pressure sensitive adhesive, and even before curing, or without curing, have a solid structure with a defined thickness, and can be joined to the half-cell components by simple lamination directly in a simple process step. The complexity of the overall systems is lower if there is no need for curing after the joining of the half-cells. The absence of chemically active components eliminates the risk of unwanted side-reactions with active components of other half-cell active materials.

The electrolyte of the invention is pressure sensitive adhesive, so constituting a pressure-sensitive adhesive—both as a chemically inert system which requires no further curing, and as a reactive pressure-sensitive adhesive whose lamination can be followed by a curing process.

A pressure-sensitive adhesive or adhesive composition is understood in the invention, as is customary in the general usage, as a material which at least at room temperature is permanently tacky and also adhesive. A characteristic of a pressure-sensitive adhesive is that it can be applied by pressure to a substrate and remains adhering there, with no further definition of the pressure to be applied or the period of exposure to this pressure. In general, though in principle dependent on the precise nature of the pressure sensitive adhesive and also on the substrate, the temperature and the atmospheric humidity, the influence of a minimal pressure of short duration, which does not go beyond gentle contact for a brief moment, is enough to achieve the adhesion effect, while in other cases a longer-term period of exposure to a higher pressure may also be necessary.

Pressure-sensitive adhesives have particular, characteristic viscoelastic properties which result in the permanent tack and adhesiveness. A feature of these adhesives is that when they are mechanically deformed, there are processes of viscous flow and there is also development of elastic forces of recovery. The two processes have a certain relationship to one another in terms of their respective proportion, in dependence not only on the precise composition, the structure and the degree of crosslinking of the pressure-sensitive adhesive, but also on the rate and duration of the deformation, and on the temperature.

The proportional viscous flow is necessary for the achievement of adhesion. Only the viscous components, frequently brought about by macromolecules with relatively high mobility, permit effective wetting and effective flow onto the substrate where bonding is to take place. A high viscous flow component results in high pressure sensitive adhesiveness (also referred to as tack or surface stickiness) and hence often also in high adhesion. Highly crosslinked systems, crystalline polymers, or polymers with glasslike solidification lack flowable components and are in general devoid of tack or possess only little tack at least.

The proportional elastic forces of recovery are necessary for the achievement of cohesion.

They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For more precise description and quantification of the extent of elastic and viscous components, and also of the relationship between the components, the variables of storage modulus (G') and loss modulus (G") are employed, and can be determined by means of dynamic mechanical analysis (DMA). G' is a measure of the elastic component, G" a measure of the viscous component, of a substance. Both variables are dependent on the deformation frequency and the temperature.

The variables can be determined using a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle θ.

The storage modulus G' is defined as follows: $G'=(\tau/\gamma)\cdot\cos(\delta)$ ($\tau$=shear stress, $\gamma$=deformation, $\delta$=phase angle=phase shift between shear stress vector and deformation vector). The definition of the loss modulus G" is as follows: $G''=(\tau/\gamma)\cdot\sin(\delta)$ ($\tau$=shear stress, $\gamma$=deformation, $\delta$=phase angle=phase shift between shear stress vector and deformation vector).

A composition is considered in particular to be a pressure-sensitive adhesive, and is defined in particular as such for the purposes of the invention, when at 23° C., in the deformation frequency range from $10^0$ to $10^1$ rad/sec, both G' and G" are situated at least partly in the range from $10^3$ to $10^7$ Pa. "Partly" means that at least a section of the G' curve lies within the window subtended by the deformation frequency range from $10^0$ inclusive up to $10^1$ inclusive rad/sec (abscissa) and by the G' value range from $10^3$ inclusive to $10^7$ inclusive Pa (ordinate), and if at least a section of the G" curve is likewise situated within the corresponding window.

Photoinitiators and Crosslinkers:

The mixture for polymerization in the invention, which forms the basis for the pressure sensitive adhesive polymer electrolyte of the present invention, comprises 0.05-10 wt %, preferably 0.1-2 wt %, more particularly 0.1-0.5 wt % of initiator, preferably thermal initiator and/or photoinitiator, more preferably photoinitiator. The photoinitiator typically comprises a UV initiator. Accordingly, the polymerization taking place in accordance with the invention is preferably a UV polymerization. If a mixture of two or more initiators is used, the above weight fractions are based typically on the total amount of the initiators. The initiator used in the invention is preferably an initiator which initiates a radical polymerization. Accordingly, the polymerization taking place in accordance with the invention is preferably a radical polymerization.

The UV polymerization for syrup preparation and on the coated-out web may take place, for example, with the following photoinitiators, i.e. light-active initiators: 2,2-dimethoxy-2-phenylacetophenone (DMPA, 340 nm, 250 nm), 2,4,6-trimethylbenzoyldiphenylphosphine oxide (BAPO, 295 nm, 370 nm), iodonium (4-methylphenyl)[4-(2-methylpropyl)phenyl]hexafluorophosphate (242 nm), 2,2"-bithiophen-5-yl 4-N,N"-diethylaminophenyl ketone (THBP), 6,6'4((1E,1"E)-(2,5-bis(octyloxy)-1,4-phenylene) bis(ethene-2,1-diyl))bis(4,1-phenylene))bis(1,3,5-triamine-2,4-diamine)) (400 nm). As well as the stated initiators it is possible to use other known initiators from the following classes: alpha-amino ketones, metallocenes, iodonium salts, alpha-hydroxy ketones, or phosphines. Thermal stability exists preferably up to at least 50° C.

Depending on the energy of the radicals formed on initiator scission, they may be limited to initiating the acrylate polymerization or may additionally produce crosslinking reactions as well, such as, for example, 2-(4-methoxyphenyl)-4,6-bis(trichloromethyl)-1,3,5-triazine (MTT). Crosslinking of the chain is unwanted during the solution polymerization or syrup preparation, in order to keep the viscosities low for the coating. In the second polymerization step in the case of UV polymerization, crosslinking, photoactive crosslinkers may be added. They may also be polymerized electively into the chains. When using 2-oxo-1,2-diphenylethyl acrylate (benzoin acrylate) or analogues thereof, polymerization in a UV tunnel at a wavelength between 300 and 400 nm produces polymers which, after the end of the polymerization in the UV tunnel, can be crosslinked briefly and intensely with UV radiation at 250 nm by activation of the benzoin acrylate units incorporated by polymerization. These crosslinkers may equally be incorporated by polymerization during a thermally initiated solution polymerization, and activated later, after drying, with UV radiation. Essential is the crosslinking without the use of protic functional groups, in order to prepare pressure sensitive adhesive electrolytes of the invention, to ensure the electrochemical and chemical stability relative to the active materials used in the cell.

Benzophenone methacrylate (Visiomer 6976, 300 nm) and analogues thereof can also be used, with their known benefits and disadvantages. These initiators reduce the contamination with small molecules, but require a greater time for reaction because of the biomolecular reaction. Crosslinking must take place under inert conditions.

As well as the grafting initiators, the polymer matrix may also be crosslinked with crosslinking polyfunctional acrylates, these being molecules possessing more than one acrylate group. Suitable examples include hexanediol diacrylate (HDDA), ethoxylated trimethylolpropane triacrylate (ETPTA), 1,9-nonanediol dimethacrylate, 1,6-hexanediol dimethacrylate, di(trimethylolpropane) tetraacrylate, di(ethylene glycol) diacrylate (Di(EG)DA), bis(2-methacryloxyethyl) phosphate, di(ethylene glycol) trimethacrylate (Di(EG)DM), bisphenol A bis(2-hydroxypropyl)acrylate, ethylene glycol dimethacrylate (EGDM), dipropylene glycol diacrylate, trans-1,4-cyclohexanediol dimethacrylate, (Di(PG)DA), 1,3-glyceryl dimethacrylate, 1,10-decanediol dimethacrylate, dipropylene glycol dimethacrylate (Di(PG)DM), 1,4-diacryloylpiperazine, ethylene glycol divinyl ether (EGDVE), diethylene glycol diacrylate, diethylene glycol divinyl ether (Di(EG)DVE), diethylene glycol dimethacrylate, triethylene glycol dimethacrylate (tri(EG)DM), ethylene glycol diacrylate, dipentaerythritol pentaacrylate (DPentA), trimethylolpropane triacrylate (TMPTA), propoxylated trimethylolpropane triacrylate (PO3-TMPTA), propoxylated trimethylolpropane triacrylate (PO6-TMPTA), poly(ethylene glycol) diacrylate (PAI) and polyethylene glycol trimethacrylate.

Provided all of the functional groups are reacted in the end product, protic groups can also be used for the crosslinking. In that case the following crosslinkers and crosslinking systems are also suitable: isocyanate crosslinkers, epoxybased crosslinkers, melamine-based crosslinkers, peroxide-based crosslinkers, metal chelate-based crosslinkers, metal salt-based crosslinkers, carbodiimide-based crosslinkers, oxazoline-based crosslinkers, aziridine-based crosslinkers, amine-based crosslinkers or silane-based crosslinkers. Combination of different crosslinkers is likewise possible. Examples of corresponding monomers which can be used are as follows: 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, 2-hydroxyethylacrylamide, N-hydroxypropylacrylamide. Besides hydroxy monomers with acrylamide groups it is also possible to use hydroxy monomers with ethylene glycol units. One example thereof is hydroxy-terminated propylene glycol acrylate. The groups may likewise be carboxylic acid groups, carboxylic anhydride groups, amide groups, amino groups, urethane groups or urea units. If two or more of these functional groups are present, they may be identical or may be selected independently of one another from the aforesaid functional groups. Examples thereof that are very suitable in the invention are acrylic acid or methacrylic acids, N-vinylcaprolactam, N-vinylpyrrolidone, acrylamide, methacrylamide, N-alkylacrylamide, such as N-methylacrylamide, N-alkyl methacrylamides, such as N-methylmethacrylamide, N,N-dialkylacrylamides, such as N,N-dimethylacrylamide, diacetoneacrylamide, N,N-alkylmethacrylamides, such as N,N-dimethylmethacrylamide, for example. Further examples are 4-vinylpyrridine, N-vinylphthalimide and N-vinylformamide. Monomers also very suitable are monomers having (poly)ethylene glycol segments, with at least two ethylene glycol units present in the monomer. The corresponding monomers may in particular be hydroxy-terminated and/or methoxylated.

Where difunctional crosslinkers are used, the fraction thereof in the pressure-sensitive adhesive is typically between 0.2 and 10 parts by weight, more preferably between 0.5 and 3 parts by weight, of crosslinker per 100 parts by weight of the polymer component. Where trifunctional crosslinkers are used, the fraction thereof added is preferably 0.02 to 5 parts by weight per 100 parts by weight of the polymer component, more preferably 0.05 to 1 part by weight. It is also possible, however, to use crosslinkers with higher functionality. Furthermore, a plurality of crosslinkers may be used, which in terms of their functionality may be the same or different (for example, a combination of difunctional and trifunctional crosslinkers). The amounts used ought then to be adapted advantageously.

Solvents:

As described above, in accordance with the present specification, the only valid solvents (compounds) are solvents which at atmospheric pressure, i.e. 1013 mbar, have a boiling point of less than 100° C. Solvents having a boiling point at 1013 mbar of 100° C. or more, and solvents which have no boiling point at 1013 mbar, instead decomposing at 100° C. or more, are considered by contrast to be plasticizers for the purposes of the present specification.

Solvents used for polymerizing the polymer matrix of the electrolyte or as assistants for the blending of the polymer matrix with further components and additives may be, for example dry ethyl acetate. The electrochemical stability towards oxidation lies between that of diethyl carbonate (DEC) and the more stable cyclic ethylene carbonate (EC), and it can be dried very quickly and with little expenditure of energy. The presence of ethyl acetate additionally improves the low-temperature properties in respect of ion conduction. Other solvents as well, however, can be used, such as acetonitrile, 1,3-dioxolane, dimethoxyethane, ketone or ethylene glycol dimethyl ether, for example. All of the stated solvents may also simultaneously be solvents in the polymerization and an integral constituent of the final polymer electrolyte.

It is often desirable, however, for reasons of safety (odour, flammability) not to have any volatile solvents in the electrolyte, particularly if the electrochemical system is situated between two film substrates as in the case of electrochromic systems, rather than being encapsulated, as is usual with batteries, in aluminium housings or other housings of significant stability. In this case the solvent can be removed from the electrolyte of the invention after the coating of the electrolyte, by drying in a drying tunnel. An alternative possibility is to use a solvent-free polymerization process such as UV syrup polymerization, for example, to produce the polymer matrix.

If the polymer matrix has been produced by polymerization in a solvent, there are known methods for drying or concentrating the polymer-solvent mixture where appropriate, such as concentration in an extruder, for example. In this way the effect on side-reactions through residual solvent after the concentration or drying is limited.

Plasticizers:

The pressure sensitive adhesive polyelectrolyte may comprise plasticizers, preferably in a fraction of 5 to 50 wt %, more preferably in a fraction of 10 to 30 wt %, such as, more particularly, 15 to 25 wt %. Plasticizers used may be, for example, cyclic carbonates such as ethylene carbonate (EC), vinylene carbonate (VC), propylene carbonate (PC), butylene carbonate (BC) or fluoroethylene carbonate (FEC), linear carbonates such as dimethyl carbonate (DMC), diethyl carbonate (DEC) or ethyl methyl carbonate (EMC), mixed carbonates, dimethylacetamide, ethyl methanesulfonate (EMS), gamma-butyrolactone, dimethyl sulfoxide, "glymes" such as diglyme, triglyme, tetraglyme, ethylene glycol diacetate, ketones, or various ethers or polyethers, or mixtures thereof. Particular preference in the invention is given to the use as plasticizer of diethyl carbonate (DEC) and/or ethylene carbonate (EC). Dimethylacetamide particularly may be used, for example, without significantly lowering the solubility of the conducting salts. All of the stated plasticizers may typically improve the solubility during the polymerization and, at the same time, act as an integral constituent of the final polymer electrolyte.

Polymer:

The aim of the invention is to provide a pressure sensitive adhesive electrolyte, i.e. a pressure-sensitive adhesive, which through ion conduction has a very good electrolyte function. Pressure-sensitive adhesives (PSAs) are in particular, as described above, polymeric compositions which—where appropriate through suitable additization with further components, such as tackifier resins, for example—are durably sticky and permanently adhesive at the application temperature (at room temperature unless otherwise defined) and adhere to a multiplicity of surfaces on contact, more particularly adhering instantaneously (referred to as having "tack", i.e. stickiness or touch-stickiness). They are capable, even at the application temperature without any activation by solvent or by heat, though customarily under the influence of a greater or lesser pressure, of wetting a substrate where bonding is to take place, and doing so sufficiently to allow interactions sufficient for adhesion to develop between the adhesive and the substrate. Influencing parameters essential for this purpose include the pressure and also the contact time. The particular properties of the pressure-sensitive adhesives derive among other properties from their viscoelastic properties in particular.

Pressure-sensitive adhesives comprise one or more polymers (for the purposes of this text, the polymers are referred to collectively as the "polymer component" of the PSA), which may be homopolymers and/or comonomers of different monomers polymerizable with one another. The polymer components may already per se have pressure sensitive adhesive properties, or may acquire such properties only after suitable additization, by resins, for example.

The polymer component may in principle be prepared on the basis of polymers differing in chemical nature. The pressure sensitive adhesive properties may be influenced by factors including the nature and proportion of the monomers used when polymerizing the PSAs parent polymers, the average molar mass and molar-mass distribution thereof, and the nature and amount of the additives to the PSA, such as tackifier resins, plasticizers and the like. During polymer preparation, moreover, crosslinkers may be used, typically with a fraction of 0.05 to 5 wt %, preferably 0.1 to 3 wt %.

In order to attain the viscoelastic properties, the monomers on which the PSAs parent polymers are based, and also any further components present in the PSA, may be selected more particularly such that the PSA has a glass transition temperature (according to DIN 53765) below the temperature of use (that is, usually below room temperature).

Through suitable cohesion-boosting measures, such as crosslinking reactions (formation of bridge-forming links between the macromolecules), for example, it is possible to expand and/or shift the temperature range within which a polymer composition exhibits pressure sensitive adhesive properties. The range of application of the PSAs may therefore be optimized by an adjustment between flowability and cohesion of the composition.

In accordance with the invention the pressure sensitive adhesive polyelectrolyte comprises at least one polyacrylate, i.e. poly(meth)acrylate. A "poly(meth)acrylate" is a polymer obtainable by polymerizing acrylic and/or methacrylic monomers and also, optionally, further, copolymerizable monomers. In the invention the poly(meth)acrylate is typically prepared by polymerizing acrylate monomer from the group of the (meth)acrylic esters having 4-15 carbon atoms, which as a homopolymer would have a $T_g$ by test C of less than $-30°$ C., acrylate monomer from the group of the (meth)acrylic esters having 4-25 carbon atoms and containing at least one heteroatom, which as a homopolymer would have a $T_g$ by test C of less than 100° C., and optionally further monomer. The term "(meth)acrylic esters" embraces not only methacrylic esters but also acrylic esters. The poly(meth)acrylate is polymerized in particular by free radical polymerization of the comonomers used, according to polymerization processes which are known per se.

In order to ascertain the glass transition temperature of copolymers it is possible to employ the Fox equation (cf. T. G. Fox, Bull. Am. Phys. Soc. 1 (1956) p. 123), which states that the reciprocal glass transition temperature $T_g$ (K) of the copolymer, i.e. $1/T_g$, can be calculated from the weight fractions of the comonomers used and the glass transition temperatures of the corresponding homopolymers of the comonomers:

$$\frac{1}{T_g} = \frac{w_1}{T_{g,1}} + \frac{w_2}{T_{g,2}}$$

where $w_1$ and $w_2$ represent the mass fraction of the respective monomer 1 or 2 (wt %) and $T_{g,1}$ and $T_{g,2}$ represent the respective glass transition temperature of the homopolymer of the respective monomer 1 or 2 in kelvins (K).

In the case of more than two comonomers, the equation can be generalized to $$\frac{1}{T_g} = \sum_n \frac{w_n}{T_{g,n}}$$

In the general equation, n represents the serial number of the monomers used, $w_n$ the mass fraction of the respective monomer n (wt %), and $T_{g,n}$ the respective glass transition temperature of the homopolymer of the respective monomers n in K.

The values for the glass transition temperatures of the corresponding homopolymers can also be found in relevant reference works.

High molecular weight polyethylene oxide (PEO) which forms complexes with Li salts is one of the best polymer matrices (although the oxidative electrochemical stability is limited to 3.8 V versus $Li/Li^+$, allowing a battery to operate at a maximum of up to 3 V). However, polymers based on polyvinyl chloride (PVC) and acrylates are also very suitable. Poly(vinylidene fluoride/trifluoroethylenes) or poly(vinylidene fluoride/hexafluoropropylene) in a blend with polyethylene oxide or polyethylene oxide/polyacrylonitrile (PEO/PAN) blends are likewise suitable. Acrylates with ethylene oxide (EO) units in the side chains have a higher electrochemical stability and can be operated up to 4 V (e.g. LFP cell). Additionally suitable are copolymers of vinyl chloride, acrylonitrile, methyl methacrylate, ethylene oxide, propylene oxide, epichlorohydrin, vinylidene chloride, vinylidene fluoride, ethylene succinate and hexafluoropropylene. Copolymers of vinylidene fluoride and hexafluoropropylene are frequently also used as binders for the active materials.

For pressure sensitive adhesive electrolytes of the invention, polymers based on acrylates are especially suitable, as they allow high transparency and weathering resistance to be achieved.

The weight-average molecular weight $M_w$ of the polymer or polymers of the polymer component is preferably situated in each case in the range of 200 000≤$M_w$≤3 000 000 g/mol. Figures in the present specification for the weight-average molecular weight $M_w$ and for the number-average molecular weight $M_n$ of polymers (or oligomers) are based, unless otherwise indicated, respectively, on the determination by gel permeation chromatography (GPC), under the following conditions. The eluent used in each case was THF containing 0.1 vol % of trifluoracetic acid. Measurement was made at 25° C. The pre-column used was PSS-SDV, 5μ, $10^3$ Å, ID 8.0 mm×50 mm. Separation took place using the columns PSS-SDV, 5μ, $10^3$ Å, $10^5$ Å and $10^6$ Å each with ID 8.0 mm×300 mm. The sample concentration was 4 g/l, the flow rate 1.0 ml per minute. Measurement took place against PMMA standards (μ=μm; 1 Å=$10^{-10}$ m).

The polymers of the polymer component are based typically to an extent of at least 15 wt %, such as 15 to 99 wt %, for example, on one or more alkyl (meth)acrylate monomers, i.e. alkyl(meth)acrylic esters, where the alkyl radical, i.e. the alcohol component has in particular 1 to 25 carbon atoms. The acrylate monomers used are typically as defined in Claim 1. In accordance with the invention, the polymer component used may, alternatively or additionally to the poly(meth)acrylate, comprise other relatively polar polymers, such as, for example, specially modified polyesters, polyurethanes or polyurethane acrylates.

The hydrocarbon radical of the alcohol component of the acrylate monomer used preferably in the invention may be branched or unbranched or cyclic, saturated or unsaturated, aliphatic or aromatic, substituted or unsubstituted.

The hydrocarbon radical of the alcohol component of the acrylate monomers may in particular be an alkyl or alkenyl group having 1 to 14 carbon atoms, particular advantage being possessed by hydrocarbon radicals having 4 to 10 carbon atoms. Advantageous examples of acrylate monomers are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and their branched isomers, such as, for example, isobutyl acrylate, 2-ethylhexyl acrylate, isooctyl acrylate, methyl acrylate, methyl methacrylate, ethyl acrylate, n-butyl methacrylate, n-octyl methacrylate, 2-ethylhexyl methacrylate, isooctyl methacrylate, cyclohexyl methacrylate, isobornyl acrylate, isobornyl methacrylate, 2-cyanoethyl acrylate, 1,2 diphenylethyl methacrylate, diphenylmethyl methacrylate, orthochlorobenzyl methacrylate, p-bromophenyl methacrylate and 3,5-dimethyladamantyl acrylate.

The pressure sensitive adhesive polymer electrolyte described in accordance with the invention in this text is outstandingly suitable, moreover, for use as optically clear adhesive bond in display units of electronic devices (displays), particularly as a pressure sensitive adhesive polymer electrolyte in adhesive tapes, especially as a pressure sensitive adhesive polymer electrolyte in double-sided adhesive tapes. In that case the double-sided adhesive tape may be provided with an optically transparent carrier or may be a carrierless double-sided adhesive tape. Particular preference is given to use no carrier, since in that case an ion exchange in the electrolyte is readily possible. If an optically transparent carrier is used, it must be transparent for the ions. They are therefore also suitable for electrochromic applications for windows of all kinds. Such carriers also include transparent papers made from modified cellulose fibres.

A particular advantage is a high transmission value of the pressure sensitive adhesive electrolyte at 550 nm. This provides for the necessary light transparency in this range. The Lab colour space is a colour space which covers the range of perceptible colours (see DIN EN ISO 11664-4). It has been found that in particular the b*value correlates with the perceptible degree of yellowing. b* values of more than 1 are perceived as yellow colouration. In accordance with the invention, therefore b* is optionally in the range of −1<b*<1. However, the range of values of −6<b*<6 is also still considered good in the invention. The term "haze" is used according to ASTM D1003-00 to describe the scattering of light by a body, reported as the percentage fraction of the light that is diverted more than at a predetermined angle. A haze less than 5% is preferred, more preferably a haze <2% such as for example, <1%, in order not to interfere with viewing through an electrolyte layer of the invention. Surprisingly it has been found that such clarities are realizable with the pressure sensitive adhesive electrolyte layers of the invention in spite of high levels of conducting salt.

Conducting Salts:

Common conducting salts such as lithium hexafluorophosphate, usually used at a concentration of 1 mol/l, can also be used in pressure sensitive adhesive electrolytes of the invention. $LiClO_4$ is also soluble at high concentrations in numerous solvents and polymers, and possesses large anions and a high dissociation constant. 0.75 mol/l of $LiClO_4$ can be dissolved in 10 wt % of plasticized PMMA. In terms of its moisture resistance, particular advantage is possessed by lithium bis(trifluoromethylsulfonyl)imide (LiTFSI). In principle, however, it is also possible to use other cations, such as $Na^+$, $K^+$, $Cs^+$, $Rb^+$, $Ag^+$, $Cu^+$, $Cu^{2+}$, $Mg^{2+}$, and other anions, such as $Cl^-$, $Br^-$, $I^-$, $ClO_4^-$, $SCN^-$, $AsF_6^-$, $CF_3SO_3^-$, $CH_3CO_2^-$, bis(oxalato) borate (BOB), $BF_4^-$, $[PF_3(CF_2CF_3)_3]^-$ (FAP), trifluoromethylbenzimidazole anion, difluorooxalatoborate (FOB) and $C(CF_3SO_2)_3^-$ in pure form or in a mixture.

Additives:

It may be advantageous to add nanoparticles in order to prevent the crystallization tendency of polymer electrolytes, especially of the polymer therein. Examples of suitable fillers, which in part increase the dielectric constant of the polymer composite, such as barium titanate, for example, are $CeO_2$, $Er_2O_3$, ZnO or titanium dioxide. They improve the ionic dissociation of the conducting salt and provide diffusion channels for the ions. Further additives may likewise be added, for the purpose of stabilizing the cycling stability, for example, such as cyclohexylbenzene, tert-amylbenzene, adiponitrile, 2-propynyl methanesulfonate, 1,3-propane sulfone or vinylene carbonate.

In order to prevent yellowing of the conductive coatings such as indium tin oxide or of the other active materials, for example, the electrolyte may be provided with UV protection additives which as well as in the UV-A and UV-B ranges absorb in particular in the UV-C range. Suitable examples for this purpose include 2-(2H-benzotriazol-2-yl) derivates. Ethanediamide derivates and piperidine derivates, however, may also be used. In an exceptionally preferred procedure, moreover, the acrylate adhesive of the PSA layer is admixed with at least one [3,5-bis(1,1-dimethylethyl-4-hydroxyphenyl) methyl]alkylmalonate derivate. Fractions of between 0.2 and 4.0 wt % of absorber have proven to be advantageous, with very thin layers in the region of less than 30 µm preferably having higher fractions of absorber, between 2-4 wt %, where thick electrolyte layers with a thickness of around 200 µm manage with 0.3 wt % of absorber.

In order to optimize the technical adhesive properties it is furthermore possible to admix the pressure sensitive adhesive polymer electrolytes of the invention, i.e. PSAs, with resins. Resins are considered for the purposes of this invention typically to be oligomeric and polymeric compounds having number-average molecular weights $M_n$ of not more than 10 000 g/mol; they are not included in the polymer component. Tackifying resins for addition (peel adhesion-enhancing resins, i.e. tackifier resins) that can be used include which exception all existing tackifier resins and those described in the literature. Representatives include the pinene resins, indene resins and rosins, their disproportionated, hydrogenated, polymerized and esterified derivatives and salts, the aliphatic and aromatic hydrocarbon resins, terpene resins and terpene-phenolic resins, and also $C_5$ to $C_9$ and other hydrocarbon resins. Any desired combinations of these and further resins may be used in order to adjust the properties of the resultant adhesive in line with requirements. Generally speaking, it is possible to use any resins which are compatible with (soluble in) the corresponding base polymer; reference may be made more particularly to all aliphatic, aromatic and alkylaromatic hydrocarbon resins, hydrocarbon resins based on pure monomers, hydrogenated hydrocarbon resins, functional hydrocarbon resins, and natural resins.

With the acrylate-based, pressure sensitive adhesive polymer electrolyte used typically in the invention, there is no need for the presence of tackifier resins, and so one outstanding variant constitutes the pressure sensitive adhesive electrolyte of the invention wherein no resins have been added to the PSA. Such additions frequently possess adverse effects in the context of application for optical bonds. The resins used in the prior art as tackifier resins for acrylate PSAs are usually polar in nature, in order to achieve compatibility with the polyacrylate matrix. This usually leads to the use of aromatic tackifier resins, which on prolonged storage or on light exposure are subject to a yellowish discolouration.

Product Design:

The pressure-sensitive adhesive tape of the invention may preferably be a double-sidedly adhesively furnished pressure sensitive adhesive electrolyte. The pressure sensitive adhesive electrolyte may have one or more optically transparent carrier layers, with at least one of the outer layers of adhesive, preferably two outer layers of adhesive in the case of double-sidedly adhesive, carrier-containing adhesive tapes, being based on the above-described polymer component and in particular being identical. In the case of a double-sided adhesive tape, the middle carrier layer has at least as good an ionic conduction as the surrounding layers of the pressure sensitive adhesive electrolyte.

Especially advantageous are double-sidedly adhesive, carrier-less adhesive tapes, especially those adhesive tapes which are formed exclusively of the layer, as described in accordance with the invention, of an ion-conductive acrylate PSA.

One possible embodiment of the pressure sensitive adhesive tape may also be provided as a single-sided adhesive tape, with the electrolyte of the invention in the case of this embodiment being already bonded on a half-cell and taking the form of a roll material. In this case the layer construction comprises either the components of foil carrier-conducting coating-cathode material-electrolyte-liner (optional) or the components of film carrier-conductive coating-anode material-electrolyte-liner (optional), in the order stated. Through the provision of a half-cell as an intermediate product, the manufacture of the cells can be delocalized, particularly since the intermediate product is stable over a long transport distance.

The additized polyacrylate obtainable as set out above is made into a layer of PSA by application to one or both sides of an optically transparent carrier, in which case it is possible to use a permanent carrier, which is retained in the adhesive tape construction in the application as well. Particularly advantageous, however, are carrier-less adhesive tapes, especially single-layer adhesive tapes, which in one very advantageous embodiment consist in the application of the PSA layer on its own (known as adhesive transfer tapes) and which, for handling, converting and commercial offering beforehand, are provided on one or both sides with a temporary carrier, being wound in particular into a roll.

In order to produce such adhesive transfer tapes, the pressure sensitive adhesive polyacrylate electrolyte obtainable as set out above is advantageously coated in the desired layer thickness onto a temporary carrier (made in particular from anti-adhesive and/or anti-adhesively furnished materials, known as liner materials, release materials or (release) liners, such as siliconized papers, films or the like, for example). In principle it is possible here to use all release materials that are suitable for polyacrylate PSAs. Particularly preferred for use are release liners with a PET carrier core.

It is also possible to produce adhesive tapes having two layers of (pressure-sensitive) adhesive of different kinds, with at least one of the layers being a PSA layer (of the invention) as described within this specification. The PSA layers may be directly adjacent (two-layer adhesive tape), or optionally there may also be one or more further layers between the two PSA layers, such as carrier layers or the like, for example (multi-layer construction).

Methods for Producing the Polymer Electrolytes:

Suitable in principle as possible methods for producing PSAs of the invention are, in particular, solution polymerization and solution coating, UV polymerization and extrusion.

In the case of solution polymerization, the polymer is produced in a solvent and additives are either already added before or during the polymerization or else are added to the polymer solution after the polymerization. Thereafter the polymer solution is coated onto a web of release paper, and the solvent is removed wholly or partly by drying.

In the case of extrusion, polymerization also takes place in a solvent. Some or all of the additives may already be added during the polymerization or thereafter. The polymer solution is then concentrated, to give a low-solvent or solvent-free polymer melt which has a high viscosity but is not crosslinked, and which subsequently can be admixed further with additives or can be coated directly by extrusion through a slot die or by sheathing in a calendar onto a release paper or other substrate. Concentration may take place, for example, in an extruder.

In the same extruder or in further extruder connected in series, further additives such as conducting salts and/or crosslinkers can be added to the polymer melt. After coating, crosslinking is accomplished, for example, thermally or with photoinduction, in other words induced by light.

UV polymerization has proven to be particularly advantageous. It emerged in the course of the extensive investigations that as well as other monomers, 2-cyanoethyl acrylate has a very rapid propensity to gelling, owing to the low purities available on the market, while being highly suitable for electrolytes of the invention. The monomer contains a high fraction of unwanted diacrylates, which lead to unwanted crosslinking or gelling. In the case of UV polymerization in bulk, this effect has no adverse consequences for the optical appearance of the electrolyte web. The crosslinking and cohesion-boosting effect may even be exploited advantageously for electrolytes of the invention. For instance, the further addition of photoactive crosslinkers or polyfunctional acrylates such as hexanediol diacrylate (HDDA) for example, can be reduced or even avoided entirely. Both 2-cyanoethyl acrylate and 2-(2-ethoxyethoxy)ethyl acrylate are therefore used with preference in producing the polymer electrolyte of the invention.

The invention is illustrated below by a number of examples. The examples described below illustrate particularly advantageous versions of the invention, without wishing thereby to subject the invention to any unnecessary limitation.

EXAMPLES

Raw materials used in the examples were as follows:
(a) Acrylate monomers:
2-ethylhexyl acrylate (EHA) from BASF, which in homopolymerized form has a $T_g$ by test C of −50° C.
2-(2-ethoxyethoxy)ethyl acrylate from Polysciences, which in homopolymerized form has a $T_g$ by test C of −70° C.
2-cyanoethyl acrylate (2-CEA, Bimax name BX-2-CEA) from Bimax Speciality Polymers, which in homopolymerized form has a $T_g$ by test C of 4° C.
Glycidyl methacrylate from Mitsubishi Gas Chemical Company, which in homopolymerized form has a $T_g$ by test C of 41° C.

(b) Thermal initiators:
Vazo 67™: 2,2'-azobis(2-methylbutyronitrile) from DuPont
(c) Photoinitiators:
Benzoin ethyl ether from Sigma-Aldrich
Lauroyl peroxide (LPO) ($C_{24}H_{46}O_4$) from Sigma-Aldrich, also suitable as a thermal initiator
(d) Radical scavenger:
Perkadox 16™: Bis(4-tert-butylcyclohexyl) peroxydicarbonate from Akzo Nobel
(e) Crosslinkers:
Hexanediol diacrylate (HDDA) from Polysciences
Trimethylolpropane trimethacrylate (TMPTMA) ($C_{16}H_{26}O_6$) from Polysciences
2-(4-methoxyphenyl)-4,6-bis(trichloromethyl)-1,3,5-triazine (MTT) from TCI Deutschland GmbH
(f) Conducting salts:
Lithium hexafluorophosphate ($LiPF_6$) from Sigma-Aldrich
Lithium bis(trifluoromethylsulfonyl)imide (LiTFSI) from Sigma-Aldrich
Lithium tetrafluoroborate (LiTFB) from Sigma-Aldrich
(g) Solvents:
Diethyl ether from Sigma-Aldrich, boiling point (1013 mbar): 35° C.
Ethyl acetate from Sigma-Aldrich, boiling point (1013 mbar): 77° C.
(h) Plasticizers:
Ethylene carbonate (EC) from Sigma-Aldrich, boiling point (1013 mbar): no boiling point, instead decomposition at 248° C. (i.e. decomposition temperature=248° C.)
Diethyl carbonate (DEC) from Sigma-Aldrich, boiling point (1013 mbar): 126 to 128° C.
Ethyl methyl carbonate (EMC) from Sigma-Aldrich, boiling point (1013 mbar): 107° C.
(i) Additives:
Acetylcysteine (chain transfer agent) from Sigma-Aldrich
Zinc chloride (catalyst) from Sigma-Aldrich Example 1 below shows the preparation of a pressure sensitive adhesive polyelectrolyte of the invention by means of solution polymerization. Disregarding solvents, the components used bring the total to 100 wt %.

Example 1—Solution Polymerization

A cyanoethyl acrylate-based, pressure sensitive adhesive polymer of the invention was prepared by charging a glass reactor having a capacity of 2 L with 302 g of a mixture of 3.53 wt % of glycidyl methacrylate, 35.29 wt % of 2-cyanoethyl acrylate and 31.76 wt % of 2-ethylhexyl acrylate, 0.47 wt % of acetylcysteine, 10.59 wt % of EC and 10.59 wt % of DEC in 300 g of ethyl acetate. After degassing of the reaction solution, with passage of nitrogen through the solution for 45 minutes with stirring, the solution was heated to a temperature of 58° C. and 0.2 g (0.05 wt %) of 2,2'-azobis(2-methylbutyronitrile) (Vazo 67™ from DuPont) was added as radical initiator. Following the addition the reaction solution was heated to a temperature of 75° C. and the polymerization reaction was carried out at this temperature. One hour after the beginning of the reaction, the reaction mixture was admixed with a further 0.2 g (0.05 wt %) of 2,2'-azobis(2-methylbutyronitrile). Four hours after the beginning of the reaction, the reaction mixture was diluted with 100 g of ethyl acetate. A further 100 g of ethyl acetate were added after a further four hours (in other words eight hours after the beginning of the reaction). To reduce the residual radical initiator remaining in the reaction mixture, the reaction mixture was admixed, eight and ten hours after the beginning of the reaction, with in each case 0.6 g (0.14 wt %) of bis-(4-tert-butylcyclohexanyl) peroxydicarbonate (Perkadox 16™ from Akzo Nobel). Twenty four hours after the beginning of the reaction, the polymerization reaction was ended by cooling of the reaction mixture to room temperature (23° C.). To produce an adhesive from the resulting polymer, the reaction product was blended with 15 g of a 10 wt % strength solution of zinc chloride in diethyl ether, corresponding to 0.35 wt % of zinc chloride. In addition 7.06 wt % of LiTFSI were added as conducting salt, and the mixture was coated out using a comma bar on a release film (dry thickness: 30 μm) and dried (40 m tunnel with eight drying zones at 30, 40, 40, 60, 90, 120, 120 and 20° C. and a belt speed of 15 m/min.). A small part of the plasticizer (EC or DEC) evaporates in the dryer, with more than 80 wt % of the plasticizers still being present after drying.

The examples below show the preparation of a pressure sensitive adhesive polyelectrolyte of the invention by means of UV polymerization (Examples 2 to 9) and also of a comparative electrolyte likewise produced by UV polymerization (Comparative example 10).

Examples 2 to 9—UV Polymerization

The electrolytes of the invention, polymerized preferably without solvent, were produced with the successive steps of a) prepolymer preparation, i.e. syrup preparation, b) formulation of the prepolymer, i.e. incorporation of the prepolymer or syrup into the final mixture, and c) coating and curing the final mixture, with curing relating to the polymerization or crosslinking. All quantity figures are based on the final formulation after process steps a) and b). See the details below:

Example 2

The individual steps in the preparation of the pressure sensitive adhesive polymer electrolyte are described below with reference to Example 2, including the respective quantities:

Step a) A mixture of 25 wt % of 2-ethylhexyl acrylate (2-EHA), 35 wt % of 2-(2-ethoxyethoxy)ethyl acrylate and 0.2 wt % of benzoin ethyl ether was irradiated in a stirred tank reactor with a Philips Actinic BL TL-D 15 W/10 1SL/25 UV lamp (UV-A radiation 350-400 nm, distance from the surface of the reaction mixture: 20 cm) to a conversion of 10% as monitored with a ReactIR 702L TEMCT from Mettler Toledo. During the reaction the reaction temperature was held at 20° C. The reaction was ended when the target conversion was reached, by shutting off the lamp and blowing in oxygen.

Step b) The reaction mixture from step a) ("syrup") was mixed with 29.55 wt % of 2-cyanoethyl acrylate (2-CEA), a further 0.1 wt % of benzoin ethyl ether, 0.15 wt % of 2-(4-methoxyphenyl)-4,6-bis(trichloromethyl)-1,3,5-triazine (MTT) and 10 wt % of lithium hexafluorophosphate.

Step c) A layer 30 μm thick was applied by nozzle coating to a siliconized liner (75 μm PET) and lined with a second 75 μm PET liner. With exclusion of oxygen, the mixture was irradiated between the two liners using the same UV-A radiation as for preparation of the syrup. Curing was performed with a dose of 80 mWs/cm$^2$ by means of 56 Philips Actinic BL TL-D 15 W/10 1SL/25 lamps, with the residence time in the irradiation tunnel being 3.5 minutes, i.e. 210 seconds.

Examples 3 to 9

The pressure sensitive adhesive polyelectrolytes of Examples 3 to 9 were prepared as described above for the polyelectrolyte from Example 2, with the nature and amount of the components used being varied as specified in Table 1 (the components add up to 100 wt % in each case). Where used, plasticizers (EC, DEC) are still completely in the product after curing.

Comparative Example 10—UV Polymerization

The electrolyte from comparative example 10 was also prepared by UV polymerization. In this case, however, a prepolymerization step a) was omitted. In a step b), the components trimethylolpropane trimethacrylate (TMPTMA), lauroyl peroxide, lithium hexafluorophosphate, ethylene carbonate, diethyl carbonate and ethyl methyl carbonate were mixed, and in step c) a layer 30 μm thick was applied to a siliconized liner (75 μm PET) and lined with a second 75 μm PET liner. With exclusion of oxygen, the mixture was irradiated between the two liners using UV-A radiation. The curing was performed with a dose of 80 mWs/cm$^2$ by means of 56 Philips Actinic BL TL-D 15 W/10 1SL/25 lamps, the residence time in the irradiation tunnel being 3.5 minutes, i.e. 210 seconds (instead of the irradiation, curing may also take place thermally at 80° C. for 1800 seconds). The nature and amount of the components are likewise specified in Table 1.

TABLE 1

Components in preparing the polymer electrolytes and curing conditions.

| Example | Components step a) | Added components step b) | Dose (time) in step c) |
|---|---|---|---|
| 2 | 25 wt % 2-EHA, 35 wt % 2-(2-ethoxyethoxy)ethyl acrylate, 0.2 wt % benzoin ethyl ether | 31.55 wt % 2-CEA, 0.1 wt % benzoin ethyl ether, 0.15 wt % MTT, 8 wt % LiPF$_6$ | 80 mWs/cm$^2$ (210 s) |
| 3 | 20 wt % 2-EHA, 30 wt % 2-(2-ethoxyethoxy)ethyl acrylate, 0.2 wt % benzoin ethyl ether | 19.55 wt % 2-CEA, 0.1 wt % benzoin ethyl ether, 0.15 wt % MTT, 10 wt % LiPF$_6$, 10 wt % EC, 10 wt % DEC | 80 mWs/cm$^2$ (210 s) |

TABLE 1-continued

Components in preparing the polymer electrolytes and curing conditions.

| Example | Components step a) | Added components step b) | Dose (time) in step c) |
|---|---|---|---|
| 4 | 25 wt % 2-EHA, 35 wt % 2-(2-ethoxyethoxy)ethyl acrylate, 0.2 wt % benzoin ethyl ether | 31.7 wt % 2-CEA, 0.1 wt % benzoin ethyl ether, 8 wt % $LiPF_6$ | 80 $mWs/cm^2$ (210 s) |
| 5 | 20 wt % 2-EHA, 30 wt % 2-(2-ethoxyethoxy)ethyl acrylate, 0.2 wt % benzoin ethyl ether | 19.7 wt % 2-CEA, 0.1 wt% benzoin ethyl ether, 10 wt % $LiPF_6$, 10 wt % EC, 10 wt % DEC | 80 $mWs/cm^2$ (210 s) |
| 6 | 54.55 wt % 2-EHA, 40 wt % 2-(2-ethoxyethoxy)ethyl acrylate, 0.2 wt % benzoin ethyl ether | 0.1 wt % benzoin ethyl ether, 0.15 wt % MTT, 5 wt % $LiPF_6$ | 80 $mWs/cm^2$ (210 s) |
| 7 | 25 wt % 2-EHA, 35 wt % 2-(2-ethoxyethoxy)ethyl acrylate, 0.2 wt % benzoin ethyl ether | 31.55 wt % 2-CEA, 0.1 wt % benzoin ethyl ether, 0.15 wt % MTT, 8 wt % LiTFSI | 80 $mWs/cm^2$ (210 s) |
| 8 | 25 wt % 2-EHA, 35 wt %, 2-(2-ethoxyethoxy)ethyl acrylate, 0.2 wt % benzoin ethyl ether | 31.55 wt % 2-CEA, 0.1 wt % benzoin ethyl ether, 0.15 wt % MTT, 8 wt % LiTFB | 80 $mWs/cm^2$ (210 s) |
| 9 | 18.15 wt % 2-EHA, 30 wt % 2-(2-ethoxyethoxy)ethyl acrylate, 0.2 wt % benzoin ethyl ether | 19.55 wt % 2-CEA, 0.1 wt % benzoin ethyl ether, 2 wt % HDDA, 10 wt % $LiPF_6$, 10 wt % EC, 10 wt % DEC | 80 $mWs/cm^2$ (210 s) |
| 10 | No prepolymerization | 2 wt % TMPTMA, 1 wt % LPO, 97 wt % 1 M $LiPF_6$ in EC:EMC:DEC (weight ratio 1:1:1) | 80 $mWs/cm^2$ (210 s) (or 80° C. (1800 s)) |

Results and Discussion:

Table 2 shows the profile of properties of the polymer electrolytes prepared in Examples 1 to 10. Reported in each case are the ionic conductivity, the glass transition temperature ($T_g$), the peel adhesion (PA) on steel, the holding power (HP), the heat resistance (Shear Adhesion Failure Temperature, SAFT), the haze, the transmission and the colour parameters b* as determined in the test methods section.

TABLE 2

Profile of properties of the polymer electrolytes.

| Example | Ionic conductivity [S/cm] | $T_g$ [° C.] | PA steel [N/cm] | HP [min.] | SAFT [° C.] | Haze [%] | Transmission [%] | b* |
|---|---|---|---|---|---|---|---|---|
| 1 | $1.5*10^{-5}$ | −28 | 4.5 | 10000 | >200 | 2.0 | 98 | 2.6 |
| 2 | $8.8*10^{-5}$ | −45 | 4.2 | 10000 | >200 | 1.1 | 98 | 1.5 |
| 3 | $2.3*10^{-3}$ | −52 | 3.9 | 8668 | 135 | 1.3 | 98 | 1.1 |
| 4 | $1.2*10^{-4}$ | −53 | 4.6 | 9567 | 161 | 1.1 | 99 | 1.2 |
| 5 | $4.2*10^{-3}$ | −51 | 3.6 | 4571 | 144 | 1.4 | 98 | 0.7 |
| 6 | $9.2*10^{-6}$ | −65 | 3.1 | 2554 | 112 | 1.3 | 97 | 1.2 |
| 7 | $2.9*10^{-5}$ | −45 | 3.8 | 10000 | 192 | 1.3 | 98 | 1.8 |
| 8 | $1.3*10^{-5}$ | −45 | 3.4 | 10000 | >200 | 1.5 | 98 | 1.1 |
| 9 | $7.3*10^{-3}$ | −51 | 2.4 | 10000 | 138 | 1.1 | 98 | 0.7 |
| 10 | $1.1*10^{-2}$ | 27 | 0.1 | n.a. | n.a. | 14.7 | 95 | 2.1 |

Example 2 shows a transparent polymer electrolyte which is able to accommodate a high fraction of conducting salt. As a result of the high polarity of more than 30 wt % polymerized 2-CEA, the solubility is high, and because of the addition in the second polymerization step on the already shaped sheet, gelling does not disrupt the optical effects. There is therefore no need for regulating additions such as RAFT regulators, for example. Because of the impurities in the raw materials, 2-CEA has a strong tendency towards gelling, and can be used only at low concentrations in the procedures normally employed. Example 3 additionally contains low molecular mass plasticizers. In spite of this the cohesion, at 8668 minutes, is still within a satisfactory range. The plasticizer fraction is beneficial to the ionic mobility, and the conductivity rises.

Example 4 shows that even without the addition of the branched crosslinker MTT it is possible to obtain sufficient cohesion with a high fraction of 2-CEA used, particularly if no further regulators are employed. There again the ionic conductivity is somewhat better than when using MTT. Example 5, however, has a low cohesion if polymerization takes place without the branching crosslinker, with a high plasticizer fraction and with a relatively small amount of 2-CEA.

Example 6 has a high fraction of apolar 2-EHA employed and correspondingly is not able to dissolve very much conducting salt. The ionic conductivity is therefore low.

Examples 7 and 8 use the conducting salts LiTSFI and LiTFB, in which case the conductivity still adopts a sufficient value, but below that of the $LiPF_6$.

Example 9 shows that good cohesion and conductivity values are still achievable, in spite of the higher plasticizer fraction, with the crosslinking monomer HDDA. Particularly noteworthy is the low b* value.

Example 10 shows an electrolyte which does have a high conductivity, but has low dimensional stability and peel adhesion. Owing to a lack of cohesion, it is not possible to measure either the holding power or the SAFT test, since the sample failed as early as during hanging prior to measurement. Moreover, the polymer network was not compatible with the conducting salt and plasticizer, so producing an uneven porous structure which exhibited a very high haze of 14.7%. Haze values of such levels are not tolerable for optically transparency cells such as electrochromic systems, for example.

Test Methods

Unless otherwise indicated, all measurements were conducted at 23° C. and 50% relative humidity. Unless indicated otherwise, moreover, the measurements of the pressure sensitive adhesive polymer electrolyte were carried out on a polymer electrolyte layer with a thickness of 30 μm; in other words, the results for the pressure sensitive adhesive polymer electrolyte typically relate to a layer thickness of 30 μm.

The mechanical and technical adhesive data were ascertained as follows:

Test A—Peel Adhesion

The peel adhesion of the samples in the form of an adhesive tape 30 μm thick on a glass substrate (peel strength) was determined with a method based on PSTC 1. A strip of the sheetlike element with a width of 2 cm was applied to a glass plate so that only one free end section of the strip was not in contact with the surface of the glass plate. The region of the adhesive strip in contact with the glass substrate was pressed onto the glass substrate in a defined way by a triple rollover using a roller having a mass of 2 kg, with each rollover comprising two pressure-exerting roller passes each in opposite travel directions. The temporary liner was subsequently removed by hand.

For the peel adhesion measurement itself, the glass plate with the sheetlike element thus mounted was fastened so as to be stationary. The sheetlike element was affixed by its free end to a tensile testing machine, and 10 min after bonding (for measurement of the instantaneous peel adhesion) it was pulled off using the tensile testing machine with a peel angle of 180° at a travel velocity of 300 mm/min. The maximum force at which there was still no parting of the bond observed corresponds to the peel adhesion on the substrate in question and is reported in N/cm. The measurement value (in N/cm) was obtained as the average from three individual measurements.

Test B—Ionic Conductivity

The ionic conductivity for lithium ions was measured by EIS (Electrochemical Impedance Spectroscopy), by calculating the ionic conductivity from the Nyquist Plot Fit of a matching equivalent circuit diagram. Measurement took place using a Metrohm Autolab PGSTAT204 with FRA32M module, with an attached Autolab Microcell HC apparatus with top-mounted TSC battery cell. A sample with a diameter of 10 mm was applied between the electrodes. The sample thickness was measured beforehand with a Wolf DM2010 thickness gauge for the purpose of calculating the cell constant. The measurement was made at a frequency of 100 kHz to 0.1 Hz with an AC voltage of 10 mV RMS. Analysis was carried out using the NOVA2 software. The measuring temperature was 25° C.

Test C—Glass Transition Temperature $T_g$

Glass transition points—referred to synonymously as glass transition temperatures—are reported as the result of measurements made by Dynamic Scanning Calorimetry (DSC) in accordance with DIN 53 765, especially section 7.1 and 8.1, but with uniform heating and cooling rates of 10 K/min in all heating and cooling steps (compare DIN 53 765; section 7.1; note 1). The initial sample mass was 20 mg.

Test D—Haze

The haze value describes the fraction of transmitted light which is scattered forward at large angles by the transirradiated sample. The haze value therefore quantifies material defects in the surface or the structure that disrupt a clear transmitted view. For sample preparation, a 30 μm adhesive transfer tape of the pressure sensitive adhesive sample was applied without bubbles to a polycarbonate film (125 μm Lexan 8010 with freshly uncovered surfaces; the haze of this film alone is 0.09%). The method for measuring the haze value is described in the standard ASTM D 1003. The standard requires the measurement of four transmission measurements. For each transmission measurement, the degree of light transmission is calculated. The four degrees of transmission are converted to give the percentage haze value. The haze value is measured using a Hazegard Plus from Byk-Gardner GmbH. The samples were transirradiated vertically and the transmitted light was measured photoelectrically in an integrating sphere (Ulbricht sphere). The spectral sensitivity is adapted to the CIE standard spectral value function Y under standard illuminant C.

Test E—Transmission

For sample preparation, a 30 μm adhesive transfer tape of the pressure sensitive adhesive sample was applied without bubbles to a polycarbonate film (125 μm Lexan 8010 with freshly uncovered surfaces; the haze of this film alone is 0.09%). The values for transmission and haze were measured on a Hazegard Plus from Byk-Gardner. The samples were transirradiated vertically and the transmitted light was measured photoelectrically in an integrating sphere (Ulbricht sphere). The spectral sensitivity is adapted to the CIE standard spectral value function Y under standard illuminant C. The transmission was measured in the wavelength length from 190 to 900 nm using a Uvikon 923 from Biotek Kontron. The absolute transmission is reported as the value at 550 nm in %. Prior to the measurement, an empty channel measurement was carried out over the entire wavelength range.

Test F—Colour Characteristics

The procedure was as per DIN EN ISO 11664, and the colour characteristics were investigated in the CIELAB three-dimensional space formed by the three colour parameters L*, a* and b*. This was done using a BYK Gardner Spectro Guide instrument, equipped with a D/65° lamp. Within the CIELAB system, L* indicates the grey value (0=black, 100=white), a* the colour axis from green to red (−120=green, +120=red) and b* the colour axis from blue to yellow (−120=blue, +120=yellow). The positive value range for b* therefore indicates, for example, the intensity of the yellow colour component. The reference used was a white ceramic tile having a b* of +1.05. This tile also served as a sample holder, onto which the adhesive layer under test was laminated. Colourimetry for the adhesive under test, i.e. the pressure sensitive adhesive sample, took place on the pure layer of adhesive in each case, with a layer thickness of 30 μm unless otherwise indicated. The values reported in the specification for L*, a* and b* of the layer of adhesive have already been processed to remove the values of the substrate tile. For example, b* of the layer of adhesive as reported in the specification is the difference between the colour value determined for the adhesive film specimen applied to the substrate tile, and the colour value determined for the pure substrate tile.

Test G—Shear Adhesion Failure Temperature (SAFT), Heat Resistance

This test serves for accelerated testing of the shear strength of adhesive tapes under temperature load. An adhesive tape (length about 50 mm, width 10 mm) cut from the respective sample specimen, i.e. from a pressure sensitive adhesive sample with a layer thickness of 30 µm, was adhered to a steel test plate cleaned with acetone, so that the steel plate protruded to the right and left beyond the adhesive tape and so that the adhesive tape protruded beyond the test plate at the upper edge by 2 mm. The bond area of the sample in terms of height×width=13 mm×10 mm. The bond site was then fixed by rolling a 2 kg steel roller over it six times at a velocity of 10 m/min. The adhesive tape was reinforced flush with a stable adhesive strip which served as a support for the travel sensor. The sample was hung up vertically by means of the test plate.

The sample specimen for measurement was loaded at the bottom end with a weight of 50 g. The steel test plate with the bonded test specimen was heated, beginning at 25° C. at a rate of 9° C. per minute, to the final temperature of 200° C. The slip travel of the specimen ("SAFT shear travel") was measured by means of the travel sensor as a function of temperature and time. The maximum slip travel is set at 1000 µm; if exceeded, the test is discontinued.

Test H—Holding Power

A strip of the respective sample specimen (adhesive tape in the form of a layer of the pressure sensitive adhesive sample having a thickness of 30 µm) 13 mm wide was applied to a steel plate. The steel plates were washed four times with acetone beforehand and left to lie in the air for at least one minute and not more than ten minutes. The area of application was 20 mm×13 mm (length×width). The adhesive tape was subsequently pressed onto the steel support four times using a roller having a weight of 2 kg. A 1 kg weight was affixed on the adhesive tape. The holding power times measured are reported in minutes and correspond to the average from three measurements. The measurements were carried out in a heating cabinet at 40° C. The experiment was discontinued in each case after a maximum duration of 10 000 min.

Test 1—Electrochemical Stability

For determining the electrochemical stability, i.e. the oxidative stability, the linear sweep voltametry (LSV) against a platinum counter-electrode with a sweep of 1 mV/s was used. A range from −0.1 V to 6.5 V against Li/Li$^+$ was measured, with platinum being used as the working electrode in the anodic range and copper as the working electrode in the cathodic range. In the plot of the current density [mA/cm$^2$] against the potential with respect to Li/Li$^+$[V], the stability window was defined for a maximum deviation in current density by 0.25 mA/cm$^2$. Measurement took place using a Metrohm Autolab PGSTAT204, with analysis using the NOVA2 software.

Test J—Relative Permittivity $\varepsilon_r$

The relative permittivity was measured at a temperature of 23° C. in a plate capacitor with variable measuring slot, the electrode plates of said capacitor having a diameter of 60 mm. For the measurement, a sample of uniform thickness was introduced as a dielectric into the measuring slot without air inclusion and was contacted, over its whole area and without interstices, with the two electrode plates. The resulting distance between the electrode plates (which ought ideally to be identical to the thickness of the sample under test) is determined by means of a slide gauge. In addition, a blank measurement was carried out with the electrode plates at an identical distance apart, for which the material under test was removed, meaning that, for the blank measurement, air was used as a dielectric of known permittivity. For both the actual measurement and the blank measurement, the capacitance of the measurement setup for a measurement frequency of 1 kHz was determined using an LCR instrument (Type: GWInstec LCR 821). The relative permittivity of the sample material was determined in a comparison of the two capacitances found; the calculation took place in accordance with conventional determination methods of the kind specified in standard ASTM D150, for example.

The invention claimed is:

1. Pressure sensitive adhesive polymer electrolyte having a peel adhesion by test A of more than 1 N/cm and an ionic conductivity by test B of more than $10^{-6}(ohm^*cm)^{-1}$, prepared by polymerizing a mixture comprising at least the following components:
   a. 5-60 wt % of acrylate monomer selected from the group consisting of (meth)acrylic esters having 4-15 carbon atoms, which as a homopolymer would have a $T_g$ by test C of less than −30° C.,
   b. 10-80 wt % of acrylate monomer selected from the group consisting of (meth)acrylic esters having 4-25 carbon atoms and containing at least one heteroatom, which as a homopolymer would have a $T_g$ by test C of less than 100° C.,
   c. 0.05-10 wt % of initiator,
   d. 2-13 wt % of conducting salt,
   e. optionally plasticizer,
   f. and optionally solvent,
   where optionally one or more of the components are added at least proportionally only during or after the polymerization.

2. Pressure sensitive adhesive polymer electrolyte according to claim 1, wherein the initiator is a thermal initiator and/or a photoinitiator.

3. Pressure sensitive adhesive polymer electrolyte according to claim 1, wherein the polymerization is a UV polymerization.

4. Pressure sensitive adhesive polymer electrolyte according to claim 1, wherein the mixture further comprises crosslinker.

5. Pressure sensitive adhesive polymer electrolyte according to claim 1, characterized by a haze by test D of less than 10%.

6. Pressure sensitive adhesive polymer electrolyte claim 1, characterized by a transmission by test E of more than 75%.

7. Pressure sensitive adhesive polymer electrolyte claim 1, characterized by a colour parameter b* by test F of −6<b*<6.

8. Pressure sensitive adhesive polymer electrolyte claim 1, characterized by a colour parameter a* by test F of −6<a*<6.

9. Pressure sensitive adhesive polymer electrolyte claim 1, characterized by a heat resistance by test G of more than 60° C.

10. Pressure sensitive adhesive polymer electrolyte claim 1, characterized by a holding power by test H of more than 10 min.

11. Pressure-sensitive adhesive tape comprising at least one layer of a pressure sensitive adhesive polymer electrolyte according to claim 1.

12. Roll of product comprising (a) a roll core and (b) in web form, a pressure-sensitive adhesive tape according to claim 11, with the pressure-sensitive adhesive tape being wound in multiple plies in the form of an Archimedean spiral on the roll core.

13. Method of using the pressure sensitive adhesive polymer electrolyte according to claim 1 or an adhesive tape comprising said pressure sensitive adhesive polymer electrolyte in an electrochromic glazing system or a battery.

14. Electrochromic system comprising a first half-cell A and a second half-cell B, with the two half-cells A and B being joined to one another over the full area or a partial area by way of a pressure sensitive adhesive polymer electrolyte according to claim 1 or an adhesive tape comprising said pressure sensitive adhesive polymer electrolyte.

15. Method for producing an electrochromic system, comprising joining a first half-cell A and a second half-cell B to one another to form an electrochromic system by lamination of a pressure sensitive adhesive polymer electrolyte according to claim 1 or an adhesive tape comprising said pressure sensitive adhesive polymer electrolyte.

16. Pressure-sensitive adhesive tape according to claim 11, wherein the pressure-sensitive adhesive tape is double-sidedly adhesive.

17. Pressure-sensitive adhesive tape according to claim 11, wherein the pressure-sensitive adhesive tape is an adhesive transfer tape.

\* \* \* \* \*